(12) United States Patent
Chunn et al.

(10) Patent No.: US 10,247,184 B2
(45) Date of Patent: Apr. 2, 2019

(54) PUMP SYSTEM

(71) Applicant: FORUM US, INC., Houston, TX (US)

(72) Inventors: Austin Chunn, Aledo, TX (US); Wesley Freed, Aledo, TX (US); Mark C. Dille, Magnolia, TX (US); David Arnoldy, Azle, TX (US)

(73) Assignee: FORUM US, INC., Houston, TX (US)

( * ) Notice: Subject to any disclaimer, the term of this patent is extended or adjusted under 35 U.S.C. 154(b) by 150 days.

(21) Appl. No.: 15/279,739

(22) Filed: Sep. 29, 2016

(65) Prior Publication Data

US 2018/0087503 A1 Mar. 29, 2018

(51) Int. Cl.
| | | |
|---|---|---|
| *F04B 53/14* | (2006.01) | |
| *F04B 19/22* | (2006.01) | |
| *F04B 23/06* | (2006.01) | |
| *F16J 1/14* | (2006.01) | |
| *F04B 1/04* | (2006.01) | |
| *F04B 9/04* | (2006.01) | |

(52) U.S. Cl.
CPC .......... *F04B 53/143* (2013.01); *F04B 1/0439* (2013.01); *F04B 1/0448* (2013.01); *F04B 9/045* (2013.01); *F04B 19/22* (2013.01); *F04B 23/06* (2013.01); *F04B 53/144* (2013.01); *F16J 1/14* (2013.01)

(58) Field of Classification Search
CPC .............. F16J 1/14; F16C 5/00; F04B 1/0439
See application file for complete search history.

(56) References Cited

U.S. PATENT DOCUMENTS

| | | | | |
|---|---|---|---|---|
| 812,745 A | * | 2/1906 | Hooley | F16C 5/00 123/58.2 |
| 1,436,915 A | * | 11/1922 | Shoemaker | F16C 5/00 384/11 |
| 1,668,976 A | * | 5/1928 | Peet | F16C 5/00 184/25 |
| 1,701,432 A | * | 2/1929 | Vaughan | F16C 5/00 384/11 |
| 6,378,418 B1 | * | 4/2002 | Parge | F04B 53/146 92/140 |
| 6,979,125 B2 | * | 12/2005 | Vicars | F16C 5/00 384/11 |
| 8,707,853 B1 | * | 4/2014 | Dille | F04B 53/14 92/165 R |
| 2004/0223669 A1 | | 11/2004 | Vicars | |
| 2010/0158726 A1 | | 6/2010 | Donald et al. | |
| 2010/0160710 A1 | * | 6/2010 | Strickland | B01D 53/72 588/409 |
| 2010/0242720 A1 | * | 9/2010 | Matzner | F04B 53/147 92/139 |

FOREIGN PATENT DOCUMENTS

| | | |
|---|---|---|
| CN | 203906205 U | 10/2014 |
| GB | 1407874 A | 10/1975 |

OTHER PUBLICATIONS

International Search Report and Written Opinion dated Feb. 6, 2018, corresponding to Application No. PCT/US2017/053497.

\* cited by examiner

*Primary Examiner* — Thomas E Lazo

(74) *Attorney, Agent, or Firm* — Patterson + Sheridan LLP

(57) ABSTRACT

A pump system includes a first pump and a second pump each having a plunger assembly. The plunger assembly includes a crosshead, a plunger, and a sleeve. The sleeve at least partially surrounds the plunger and an end of the crosshead. The sleeve is configured to create a fluid seal between the plunger and the crosshead.

23 Claims, 11 Drawing Sheets

PUMP SYSTEM

BACKGROUND

Field

Embodiments of the disclosure relate to a pump, more specifically, to a plunger assembly for cement pumps and other pump designs.

Description of the Related Art

In drilling and completion of a well, cement is pumped into an annulus between a wellbore casing and a subterranean surface. Once the cement is set, the cement can support and protect the wellbore casing from exterior corrosion and pressure changes. A cement pump having a power end and a fluid end may be used to pump the cement into the annulus. During operation, cross-contamination of fluids between the power end and the fluid end can lead to pump failure.

Thus, there is a need for improved pump designs.

SUMMARY

In one embodiment, a plunger assembly is disclosed herein. The plunger assembly includes a crosshead, a plunger, and a sleeve. The sleeve at least partially surrounds the plunger and an end of the crosshead. The sleeve forms a fluid seal between the plunger and the crosshead.

In one embodiment, a pump is disclosed herein. The pump includes a pump housing and a plunger assembly. The pump housing has an interior volume that includes a fluid end section and a power end section. The plunger assembly is disposed in the pump housing. The plunger assembly includes a crosshead, a plunger, and a sleeve. The crosshead is disposed in the pump housing and movable along a plurality of rods. The plunger extends between the fluid end section and the power end section. The sleeve at least partially surrounds the plunger and an end of the crosshead. The sleeve fluidly isolates the power end section from the fluid end section.

In one embodiment, a pump system is disclosed herein. The pump system includes a first pump and a second pump. The first pump includes a first fluid end and a first power end. The second pump includes a second fluid end and a second power end. The first pump is positioned adjacent the second pump such that the first power end abuts the second power end. The first pump and the second pump have a total length less than or equal to a roadway width restriction, which may be 102 inches for example. Each pump includes a pump housing and a plunger assembly. The pump housing has a fluid end section and a power end section. The plunger assembly is disposed in the pump housing. The plunger assembly includes at least a crosshead, a plunger, and a sleeve. The crosshead is disposed in the pump housing and movable along a plurality of rods. The plunger extends between the fluid end section and the power end section. The sleeve at least partially surrounds the plunger and an end of the crosshead. The sleeve fluidly isolates the power end section from the fluid end section.

In one embodiment, a crosshead for use in a pump assembly is disclosed herein. The crosshead includes an elongated body having a first opening that is parallel to a second opening; and a plurality of fluid passages formed in the elongated body. The plurality of fluid passages comprise a first fluid passage in communication with a fluid source; a second fluid passage in communication with the first fluid passage, the second fluid passage configured to deliver fluid from the first fluid passage to the first opening; and a third fluid passage in fluid communication with the first fluid passage, the third fluid passage configured to deliver fluid from the first fluid passage to the second opening.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

For clarity, identical reference numerals have been used, where applicable, to designate identical elements that are common between figures. Additionally, elements of one embodiment may be advantageously adapted for utilization in other embodiments described herein.

DETAILED DESCRIPTION

Figure 1:
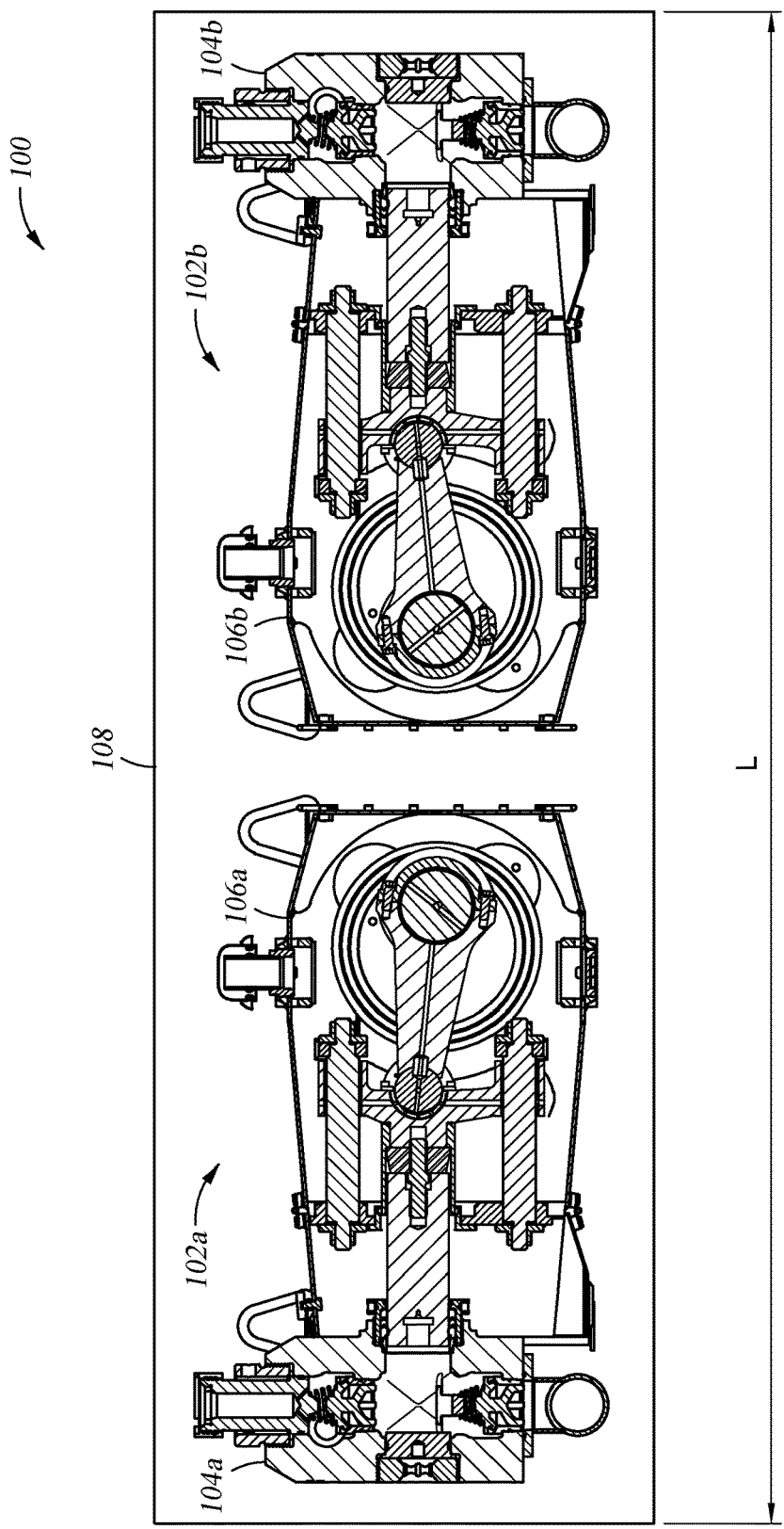
FIG. 1 illustrates a pump system 100, according to one embodiment

FIG. 1 illustrates a pump system 100, according to one embodiment. The pump system 100 includes a first pump 102a and a second pump 102b. The first pump 102a includes a fluid end 104a and a power end 106a. The second pump 102b includes a fluid end 104b and a power end 106b. The pumps 102a, 102b are mounted in a back-to-back configuration on a platform 108. For example, the platform 108 may be a skid, truck bed, trailer, etc. In the embodiment illustrated in FIG. 1, the pumps 102a, 102b are identical. In another embodiment, the pumps 102a, 102b may be different. The disclosure of the pump system 100 is exemplarily described as pumping cement. However, embodiments of the pump system 100 may be applied to pumping fracturing fluids as well as pumps for other fluids.

According to one embodiment, the pumps 102a, 102b are compact in size so as to permit the two pumps 102a, 102b to be oriented in the back-to-back configuration. For example, government regulations often provide vehicle width restrictions for operation on public roadways. In some embodiments, the pump system 100 has a total length L that is less than or equal to a roadway width restriction. For example, the pump system 100 has a total length L equal to or less than 102 inches (i.e., roadway length restriction).

Figure 2A:
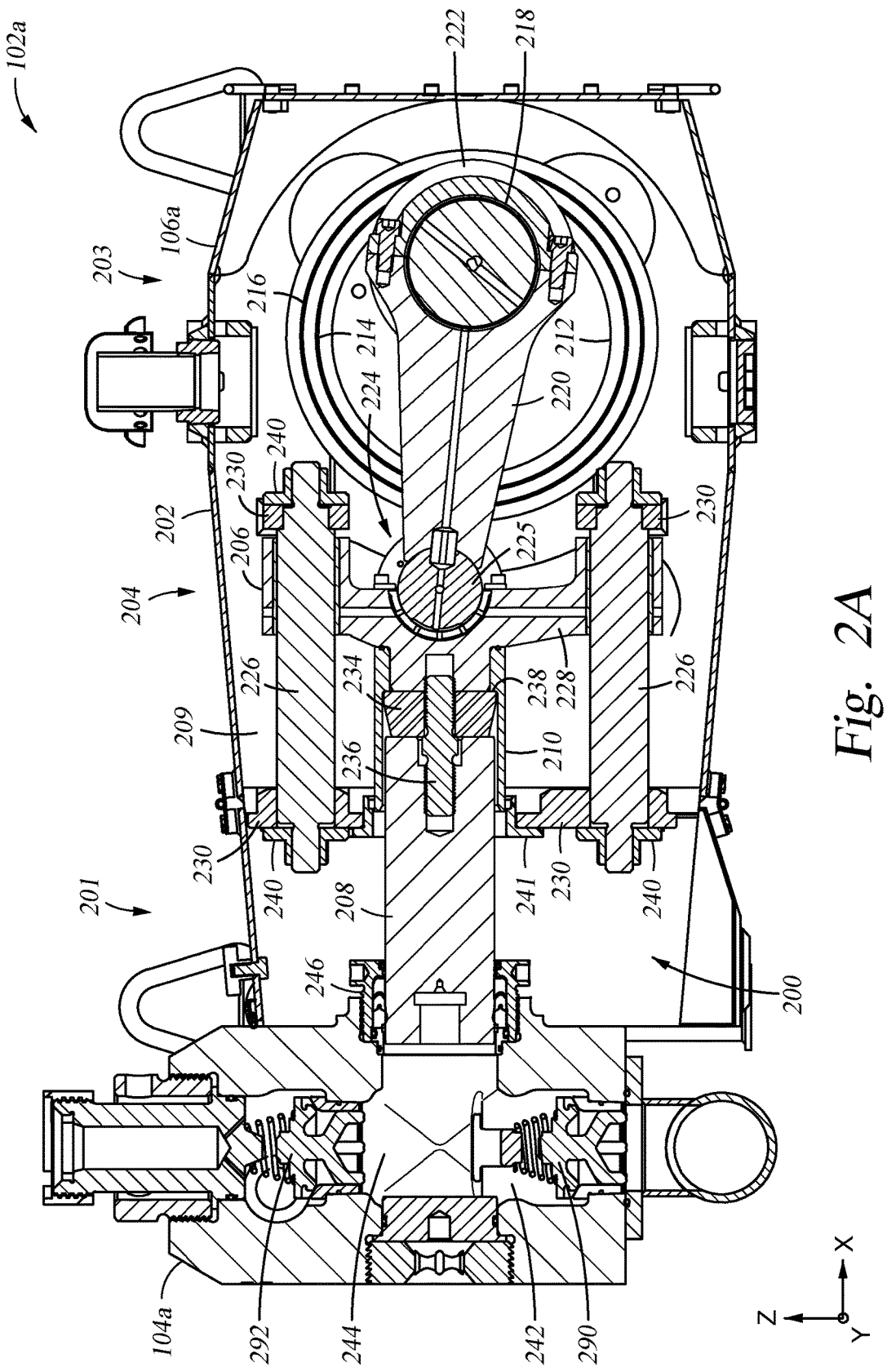
FIG. 2A-2C illustrate sectional views of a pump from the pump system in FIG. 1 at different positions during operation, according to one embodiment.
Figure 2B:
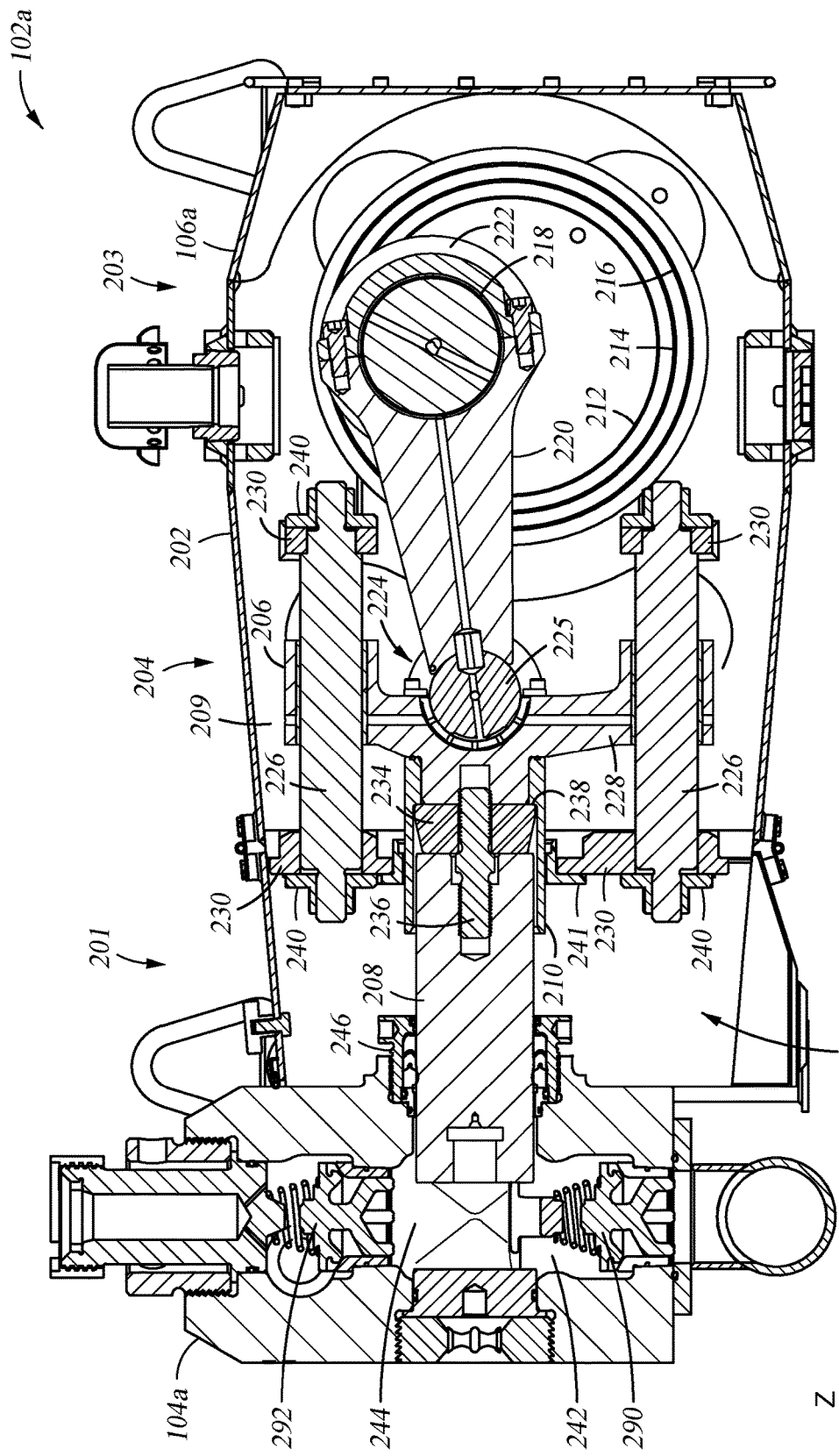
Figure 2C:
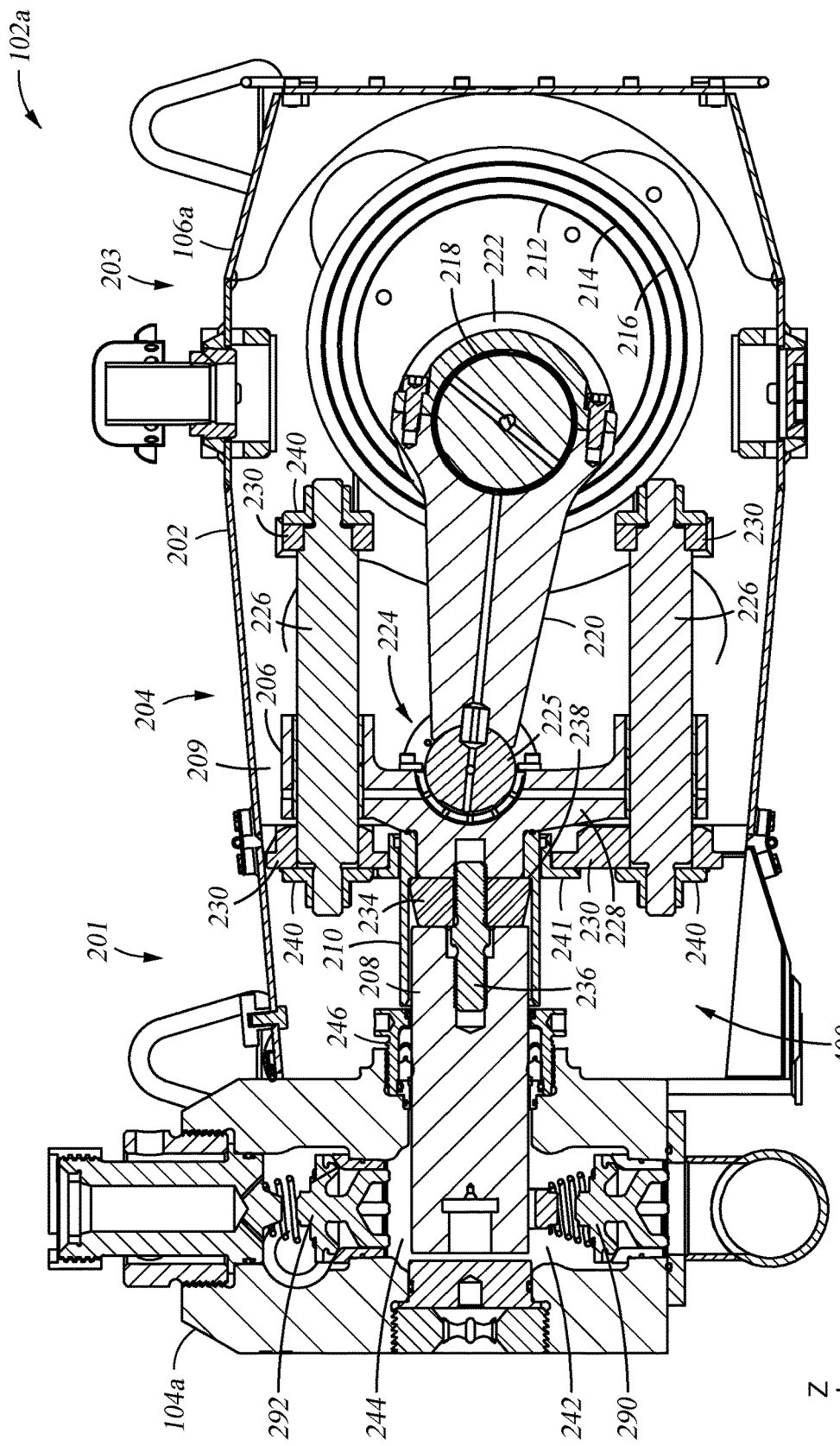

FIGS. 2A-2C illustrate sectional views of the pump 102a from the pump system 100 of FIG. 1 at different positions during operation, according to one embodiment. The pump 102b may operate in the same manner. The power end 106a is shown in a fully retracted position 200 in FIG. 2A. The power end 106a includes a pump housing 202 and a plunger assembly 204.

The pump housing 202 defines an interior volume 209, which includes a fluid end section 201 and a power end section 203. The fluid end section 201 is coupled to the fluid end 104a. The plunger assembly 204 is disposed within the pump housing 202 and reciprocates between the fluid end section 201 and the power end section 203. The plunger assembly 204 is operable to cycle between a fully extended position 400 (FIG. 2C), a mid-cycle position 300 (FIG. 2B), the fully retracted position 200 (FIG. 2A), and through the mid-cycle position 300 back to the fully extended position 400 when pumping fluid. For example, the plunger assembly 204 may pump fluid, such as cement, through the fluid end 104a under high pressure into an oil or gas well.

The power end 106a further includes a crankshaft 212 rotatably mounted in the power end section 203 of the pump housing 202. The crankshaft 212 includes a crankshaft axis 214 about which the crankshaft 212 rotates. The crankshaft 212 is mounted in the power end section 203 with bearings 216. The crankshaft 212 further includes a journal 218, which is a shaft portion to which a connecting rod 220 is attached. The connecting rod 220 includes a crankshaft end 222 and a crosshead end 224. The crankshaft end 222 is coupled to the crankshaft 212, and the crosshead end 224 is coupled to a crosshead 206. The crosshead end 224 may be coupled to the crosshead 206 by a wristpin 225.

The plunger assembly 204 may include the crosshead 206, a plunger 208, and a sleeve 210 that forms a fluid seal between the plunger 208 and the crosshead 206 as further described below. The crosshead 206 reciprocates within the pump housing 202 along a plurality of rods 226, such as two, three, four, or more, disposed in the pump housing 202. The rods 226 are secured in the pump housing 202 by a retainer member 230. The crosshead 206 includes an elongated body 228 that may be "T" shaped. The elongated body 228 of the crosshead 206 allows for more space within the pump housing 202. The additional space created in the pump housing 202 by the elongated body 228 of the crosshead 206 allows the sleeve 210 to fit within the pump housing 202. The elongated body 228 also allows for a longer plunger 208 to be implemented in the pump 102a.

The sleeve 210 is coupled to the crosshead 206 and is at least partially disposed within a space defined between the rods 226. In one embodiment, the sleeve 210 and the crosshead 206 may be formed as an integral, single piece. In the embodiment shown in FIGS. 2A-2C, the sleeve 210 and the crosshead 206 are shown as separate pieces. The sleeve 210 at least partially surrounds the plunger 208 and an end of the crosshead 206, forming a fluid seal between the plunger 208 and the crosshead 206. The plunger 208 is coupled to the crosshead 206 via a retainer plate 234 and screw 236. The retainer plate 234 sits in a step 238 formed in the sleeve 210. The screw 236 is disposed through the retainer plate 234 and is threaded into the crosshead 206 at one end and the plunger 208 at an opposite end. In an alternative embodiment, the retainer plate 234 may be coupled directly to the crosshead 206 (such as by cap screws), and the screw 236 may be threaded into the retainer plate 234 at one end and the plunger 208 at an opposite end (as further described below and shown with respect to FIG. 3B).

A plurality of sealing members 240 is coupled to the sleeve 210 and the rods 226. The sleeve 210, the plurality of sealing members 240, and the retainer member 230 form a barrier, such as a fluid seal, between the fluid end section 201 and the power end section 203 of the pump housing 202 to prevent fluid contamination between the fluid end section 201 and the power end section 203. The sleeve 210 moves with the plunger 208 as the crankshaft 212 rotates, thus maintaining the barrier between the power end section 203 and the fluid end section 201 at all points during operation of the crankshaft 212.

The fluid end 104a is coupled to the fluid end section 201 of the pump housing 202. The fluid end 104a includes a suction valve 290 and a discharge valve 292. The suction valve 290 and the discharge valve 292 are in fluid communication with a vertical bore 242 that is intersected by a crossbore 244 of the fluid end 104a. A fluid end seal assembly 246 is disposed adjacent to one end of the crossbore 244 that leads into the fluid end section 201 of the pump housing 202. In one embodiment, the fluid end seal assembly 246 may include one or more seals, such as an O-ring, positioned within the crossbore 244 to form a fluid seal between the crossbore 244, the plunger 208, and the fluid end section 201 of the pump housing 202.

In operation, the plunger assembly 204 reciprocates between the power end section 203 and the fluid end section 201 of the pump housing 202. The plunger 208 of the plunger assembly 204 may extend through the fluid end section 201 of the pump housing 202 and into the crossbore 244 as well as the vertical bore 242 of the fluid end 104a. In one embodiment, the plunger assembly 204 has a stroke length of about 6 inches. In another embodiment, the plunger assembly 204 has a stroke length between about 6 inches to 12 inches. In another embodiment, the plunger assembly 204 has a stroke length less than about 6 inches. In yet another embodiment, the plunger assembly 204 has a stroke length greater than about 12 inches.

The sleeve 210 moves with the plunger 208 as the plunger assembly 204 reciprocates between the power end section 203 and the fluid end section 201. The sleeve 210 maintains a fluid seal between the power end section 203 and the fluid end section 201 of the pump housing 202 to prevent, during the reciprocating movement of the plunger assembly 204, cross contamination (of fluids and/or solids) between the fluid end section 201 and the power end section 203. In one embodiment, the plunger assembly 204 prevents the travel of lubrication fluid from the fluid end section 201 to the power end section 203, which, over time, may deteriorate and contaminate the power end 106a of the pump 102a.

FIGS. 3A-3D illustrate enlarged views of the crosshead 206 connected to the connecting rod 220, according to one embodiment. As shown, the crosshead 206 includes the elongated body 228. The elongated body 228 includes parallel openings 302 and 304 formed at a top 306 and a bottom 308 of the elongated body 228, respectively. In one embodiment, the openings 302, 304 are substantially parallel.

Each opening 302, 304 has a length $L_{302}$, $L_{304}$, and a diameter $D_{302}$, $D_{304}$, respectively. In one embodiment, $L_{302}$ is equal to $L_{304}$. In one embodiment, $D_{302}$ is equal to $D_{304}$. When the openings 302, 304 have equal dimensions, this allows the crosshead 206 to be flipped, which thereby allows the pump 102a to be flipped, such that a back-to-back pump system configuration may be achieved.

Each opening 302, 304 may be configured to house a bushing 310. Each bushing 310 is configured to encircle and move along the rods 226 (shown in FIGS. 2A-2C). Each bushing 310 includes an annular groove 312 through which a lubricating fluid, such as oil, may be supplied to lubricate the bushings 310 and rods 226.

Figure 3A:
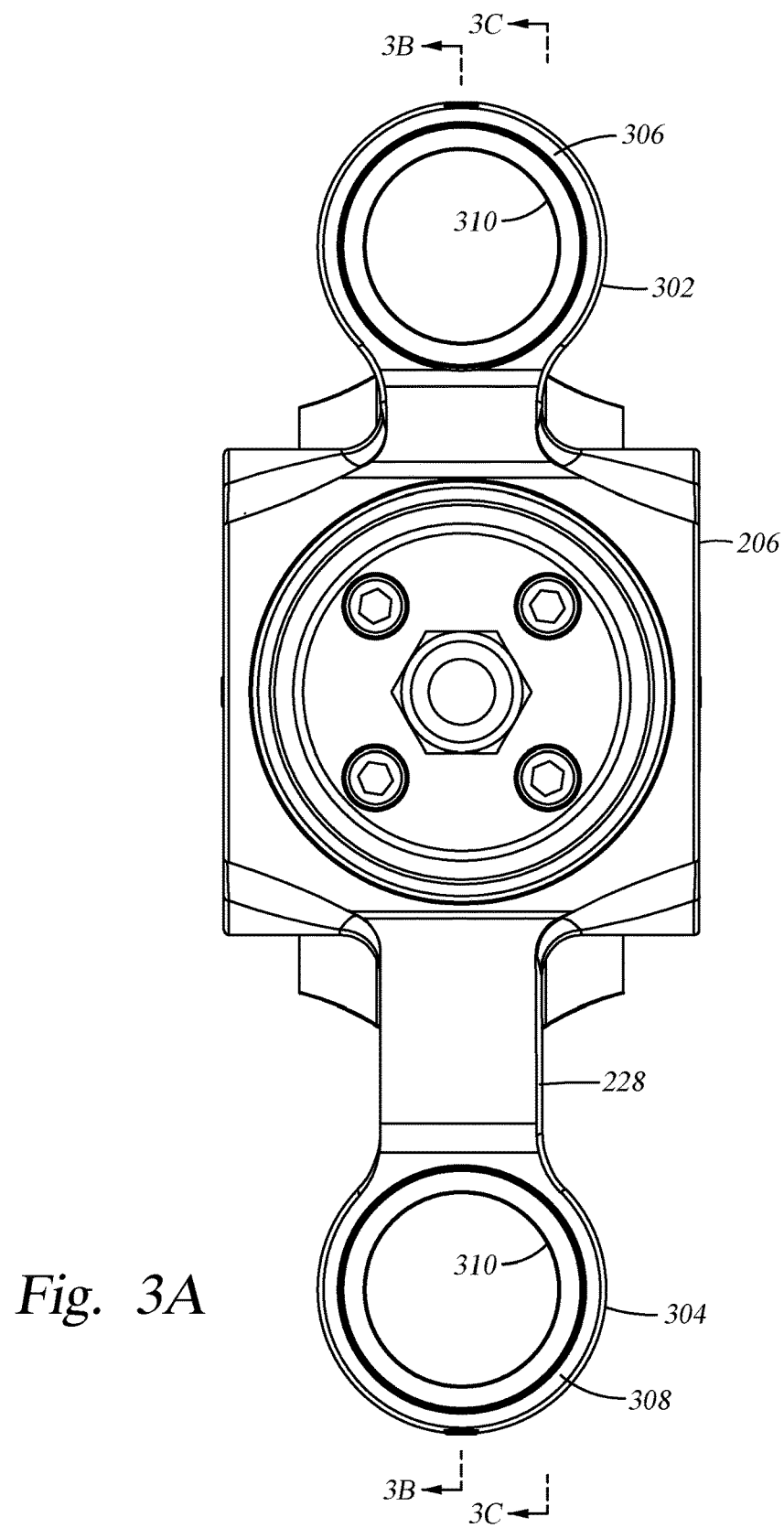
FIGS. 3A-3D illustrate sectional views of a crosshead for a pump, according to one embodiment.
Figure 3B:
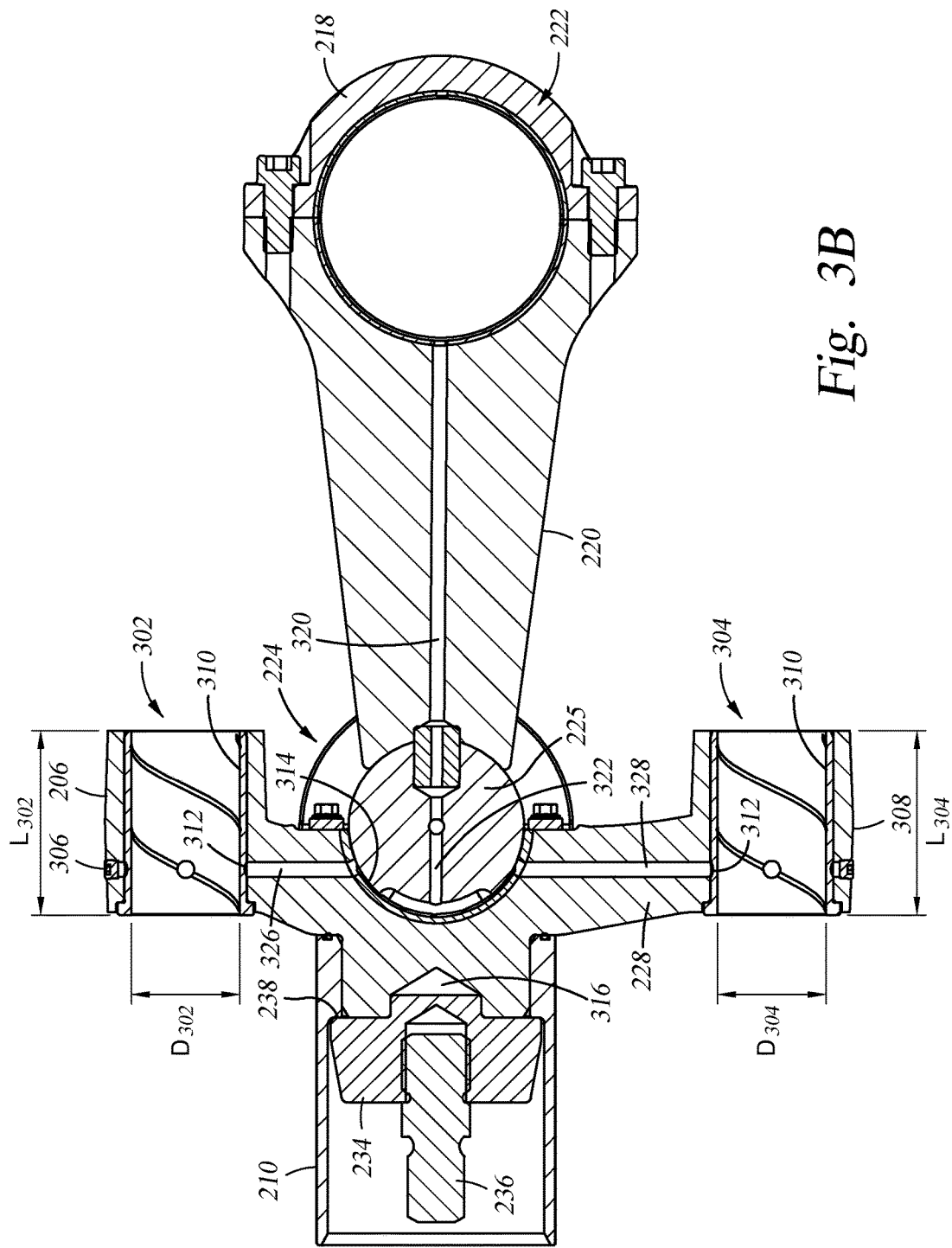
Figure 3C:
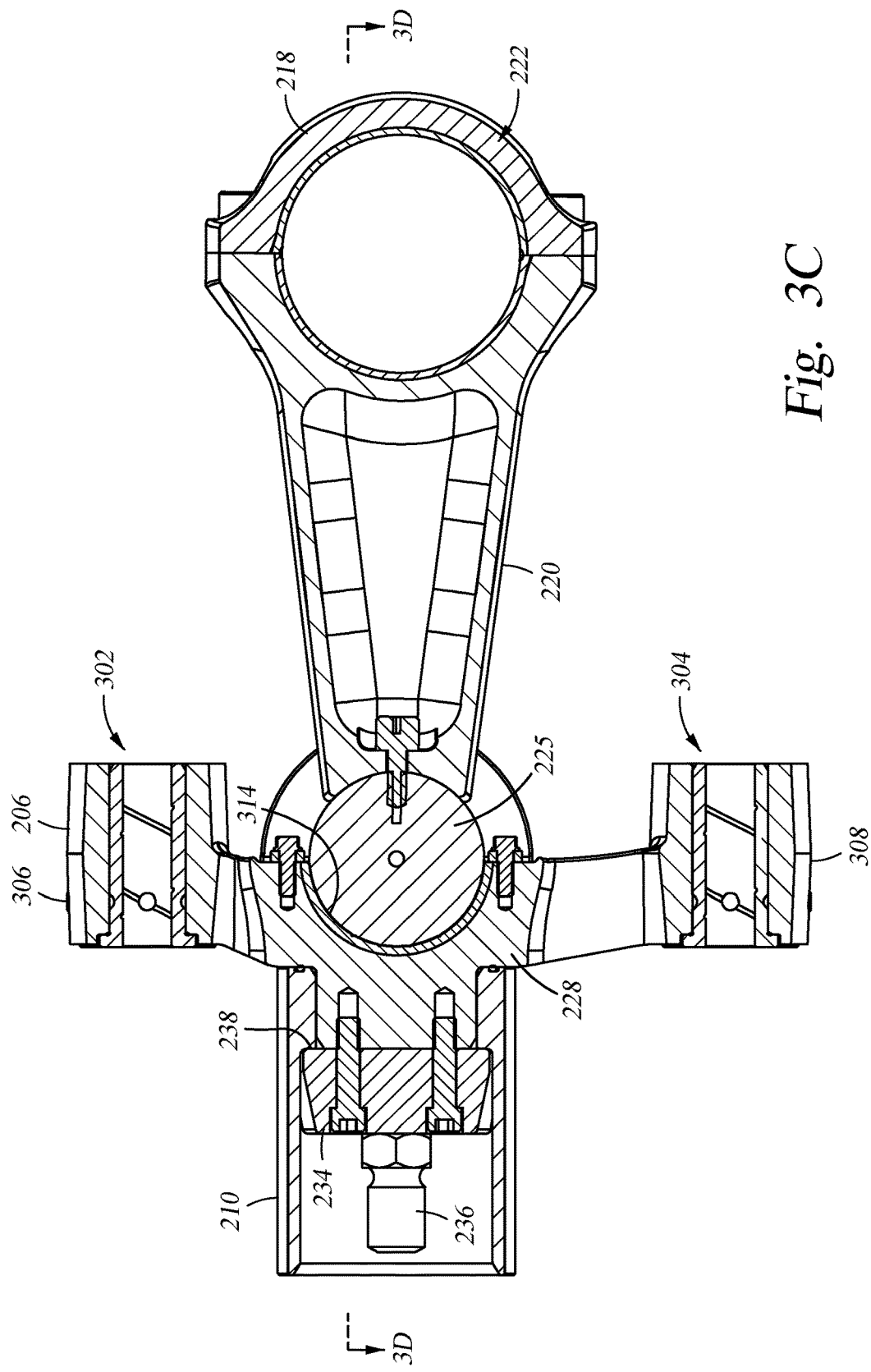
Figure 3D:
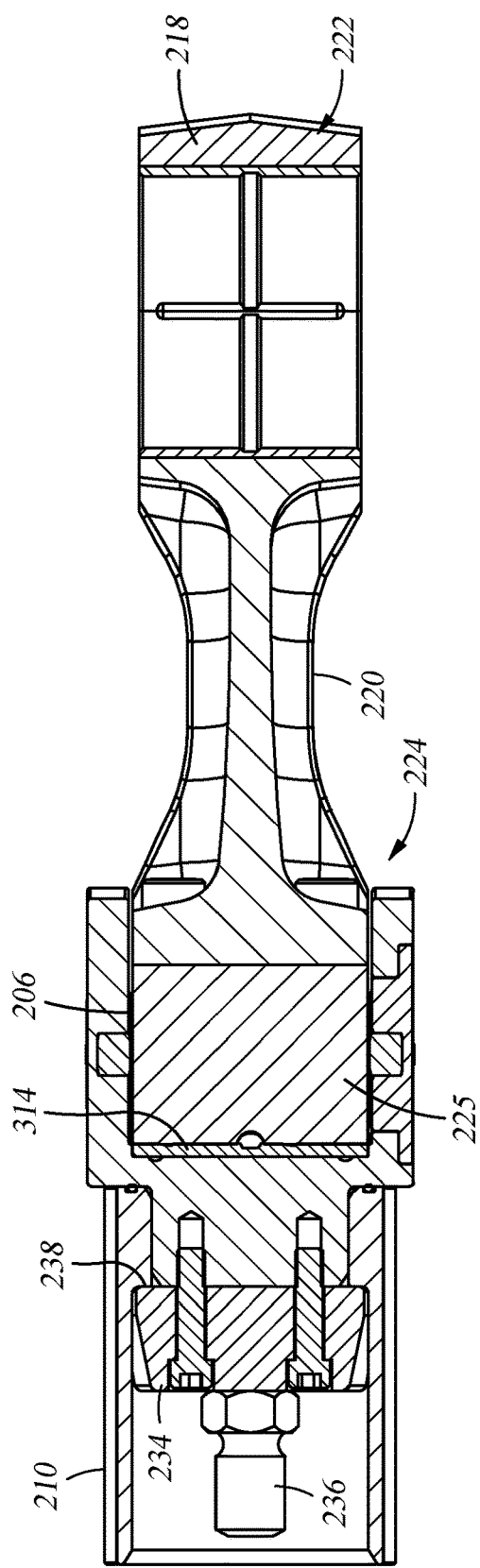

The crosshead 206 also includes a cavity 314, within which the wristpin 225 is disposed to connect the crosshead 206 to the connecting rod 220. The cavity 314 is configured to be open to the interior volume 209 of the pump housing 202, and in particular, open to the fluid end section 201. The crosshead 206 further includes an aperture 316, within which a boss feature of the retainer plate 234 is inserted as shown in FIG. 3B. The retainer plate 234 is coupled to the elongated body 228 by one or more screws as shown in FIGS. 3C and 3D. The screw 236 in this embodiment is threaded into the retainer plate 234.

Referring to FIG. 3B, a lubricating fluid may be supplied from the crankshaft 212, to the plunger assembly 204, through the connecting rod 220, the wristpin 225, and the crosshead 206 to the bushings 310. The connecting rod 220 includes a first fluid passage 320 formed therein. The first fluid passage 320 is in fluid communication with a second fluid passage 322 formed in the wristpin 225. The second fluid passage 324 is in fluid communication with a third fluid passage 326 and a fourth fluid passage 328. The third and fourth fluid passages 326, 328 are formed in the elongated body 228 of the crosshead 206. The third fluid passage 326 fluidly couples the second fluid passage 324 with opening 302. Lubricating fluid is provided from the third fluid passage 326 to the bushing 310 via the annular groove 312 formed therein. The fourth fluid passage 328 fluidly couples the second fluid passage 324 with opening 304. Lubricating fluid is provided from the fourth fluid passage 328 to the bushing 310 in opening 304 via the annular groove 312 formed therein. As such, lubricating fluid may be provided from the crankshaft end 222 of the connecting rod 220 to the crosshead 206 internally via the first, second, third, and fourth fluid passages 320-326. This allows for a more compact crosshead design as opposed to crossheads having external lubricating fluid lines.

Figure 4A:
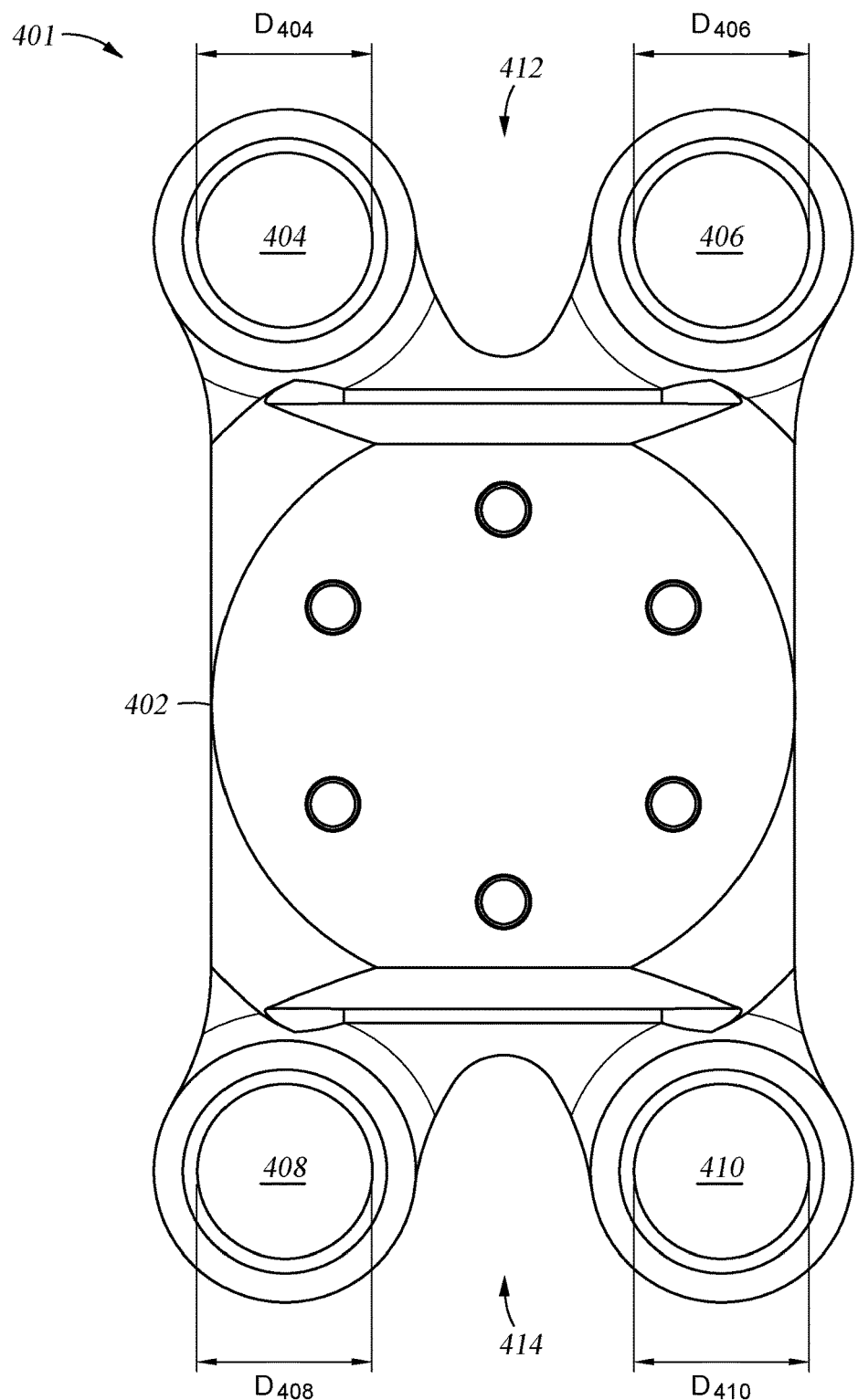
FIGS. 4A-4C illustrate enlarged views of a crosshead for a pump, according to one embodiment.
Figure 4B:
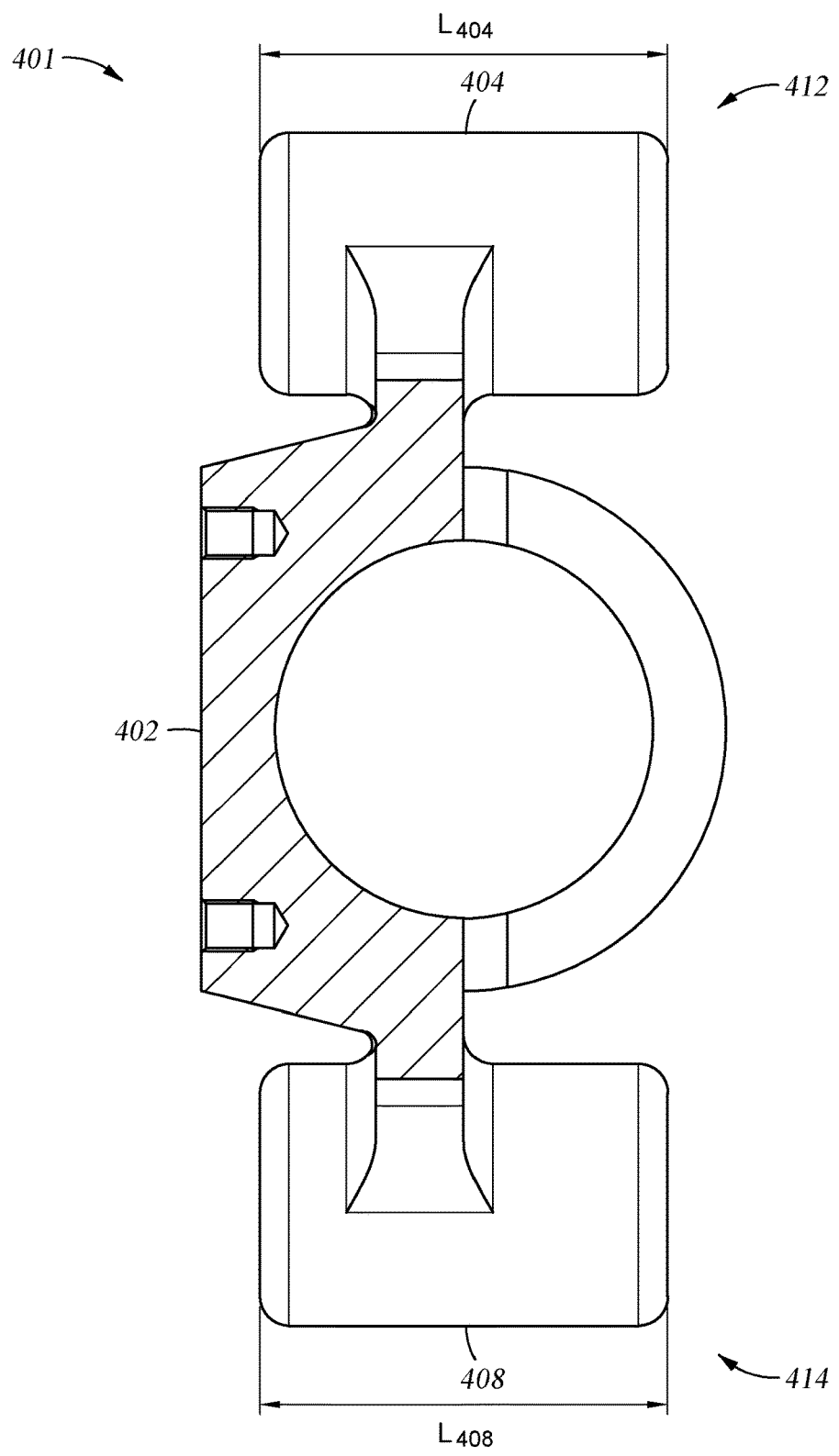
Figure 4C:
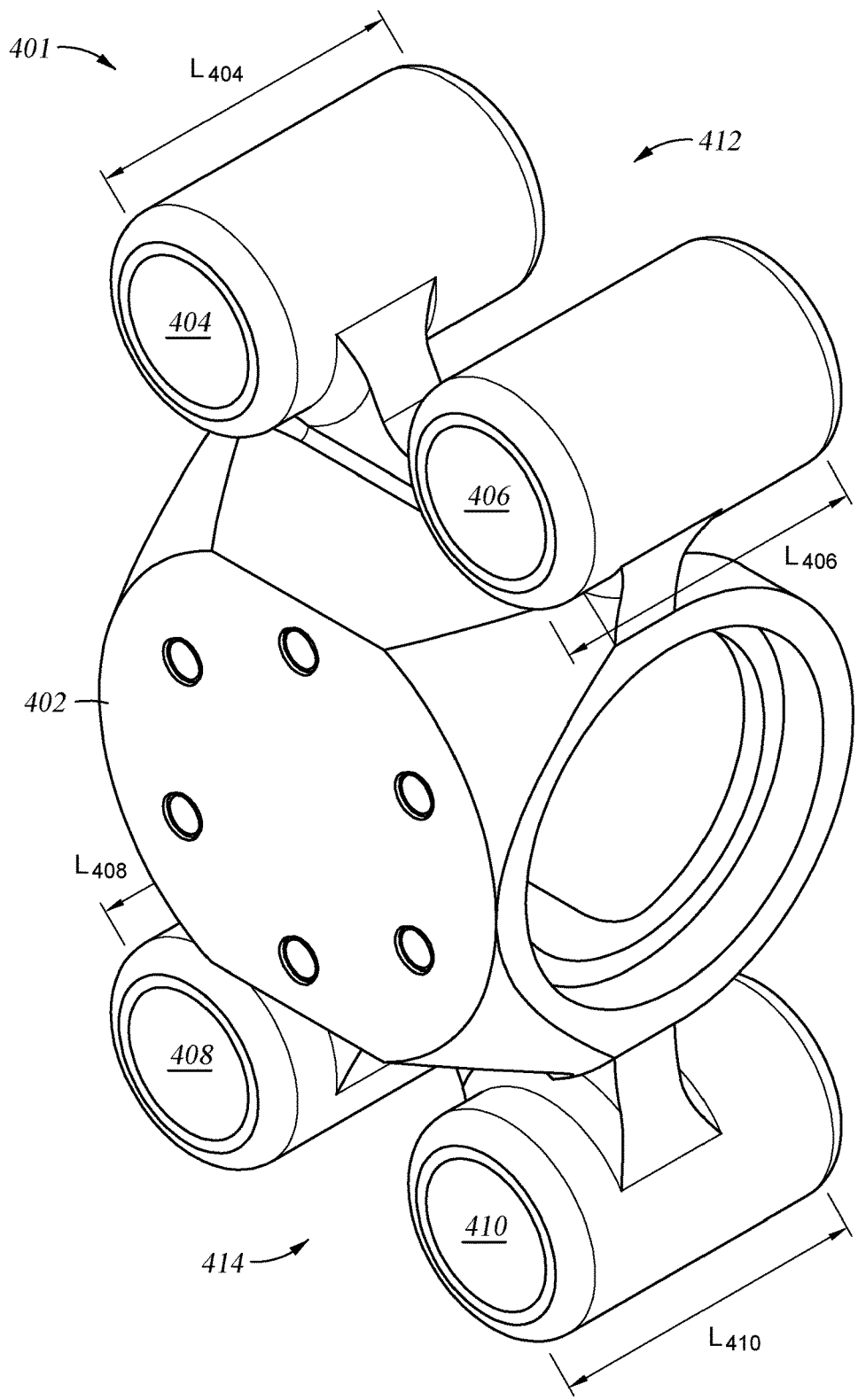

FIGS. 4A-4C illustrates an enlarged cross-sectional view of a crosshead 401 for use in the pump 102a of FIGS. 2A-2C, according to one embodiment. The crosshead 401 may be used in place of crosshead 206 but with four rods 226 disposed in the pump 102a. The crosshead 401 includes a body 402. The body 402 includes two sets of parallel openings 404, 406, 408, 410. Openings 404 and 406 are formed substantially parallel to each other at a top 412 of the body 402. Openings 408, 410 are formed substantially parallel to each other at a bottom 414 of the body 402. Additionally, opening 404 is substantially parallel to opening 408, and opening 406 is substantially parallel to opening 410. One or more lubricating fluid passages may be formed within the body 402 to provide lubricating fluid from the pump assembly 204 to the openings 404, 406, 408, 410 in a similar manner as described above.

Each opening has a length L404, L406, L408, L410, and a diameter D404, D406, D408, D410, respectively. In one embodiment, each length L404-L410 are equal, and each diameter D404-D410 are equal. When the openings 404, 406, 408, 410 have equal dimensions, this allows the crosshead 401 to be flipped, which subsequently allows the pump 102a to be flipped, such that a back-to-back pump system configuration may be achieved.

Other and further embodiments may be devised without departing from the basis scope thereof, and the scope thereof is determined by the claims that follow.

The invention claimed is:

1. A plunger assembly, comprising:
a crosshead;
a plunger;
a sleeve at least partially surrounding the plunger and an end of the crosshead, wherein the sleeve forms a fluid seal between the plunger and the crosshead; and
a plurality of rods, wherein the crosshead is movable along the rods.

2. The plunger assembly of claim 1, wherein the plunger assembly is disposed in a pump housing.

3. The plunger assembly of claim 2, wherein the plurality of rods are disposed in the pump housing.

4. The plunger assembly of claim 1, wherein the sleeve comprises a step formed therein for supporting a retainer plate.

5. The plunger assembly of claim 4, wherein the retainer plate is positioned in the step of the sleeve.

6. The plunger assembly of claim 3, further comprising a plurality of sealing members coupled to the sleeve and the plurality of rods.

7. A pump, comprising,
a pump housing defining an interior volume having a fluid end section and a power end section; and
a plunger assembly disposed in the pump housing, the plunger assembly comprising:
a crosshead disposed within a pump housing and movable along a plurality of rods;
a plunger extending between the fluid end section and the power end section; and
a sleeve at least partially surrounding the plunger and an end of the crosshead, wherein the sleeve fluidly isolates the power end section from the fluid end section.

8. The pump of claim 7, wherein the sleeve comprises a step formed therein for supporting a retainer plate.

9. The pump of claim 8, wherein the retainer plate is positioned in the step.

10. The pump of claim 7, wherein the plunger assembly further comprises a plurality of sealing members coupled to the sleeve and the plurality of rods.

11. The pump of claim 7, wherein the sleeve moves with the plunger as the plunger reciprocates between the power end section and the fluid end section.

12. The pump of claim 7, wherein the sleeve fluidly isolates the power end section from lubrication fluid in the fluid end section.

13. A pump system, comprising:
a first pump having a first fluid end and a first power end;
a second pump having a second fluid end and a second power end, wherein the first pump is positioned adjacent the second pump such that the first power end abuts the second power end, wherein the first pump and second pump having a total length less than or equal to a roadway width restriction, and wherein the first pump and the second pump each comprise:
a pump housing defining an interior volume having a fluid end section and a power end section; and
a plunger assembly disposed in the pump housing, wherein the plunger assembly comprises:
a crosshead disposed in the pump housing and movable along a plurality of rods;
a plunger extending between the fluid end section and the power end section; and
a sleeve at least partially surrounding the plunger and an end of the crosshead, wherein the sleeve fluidly isolates the power end section from the fluid end section.

14. The pump system of claim 13, wherein the sleeve comprises a step formed therein.

15. The pump system of claim 13, wherein the plunger assembly further comprises a retainer plate positioned in the step.

16. The pump system of claim 13, wherein the plunger assembly further comprises a plurality of sealing members coupled to the sleeve and the plurality of rods.

17. The pump system of claim 13, wherein the sleeve moves with the plunger as the plunger reciprocates between the power end section and the fluid end section.

18. The pump system of claim 13, wherein the sleeve fluidly isolates the power end section from lubrication fluid in the fluid end section.

19. A crosshead for use in a pump assembly, comprising:
an elongated body having a first opening that is parallel to a second opening; and
a plurality of fluid passages formed in the elongated body, the plurality of fluid passages, comprising:
a first fluid passage in communication with a fluid source;
a second fluid passage in communication with the first fluid passage, the second fluid passage configured to deliver fluid from the first fluid passage to the first opening; and
a third fluid passage in fluid communication with the first fluid passage, the third fluid passage configured to deliver fluid from the first fluid passage to the second opening.

20. The crosshead of claim 19, wherein the first opening is formed at a top of the elongated body and the second opening formed at a bottom of the elongated opening, the first and second openings having equal diameters.

21. The crosshead of claim 20, wherein the elongated body further comprises a third opening formed adjacent the first opening at the top of the elongated body, and a fourth opening formed adjacent the second opening at the bottom of the elongated body.

22. The crosshead of claim 19, further comprising a connecting rod coupled to the elongated body by wristpin, wherein lubricating from the fluid source is supplied through fluid passage within the connecting rod and the wristpin that are in communication with the first fluid passage.

23. A crosshead for use in a pump assembly, comprising:
an elongated body having a first opening that is parallel to a second opening, wherein the first opening is formed at a top of the elongated body and the second opening formed at a bottom of the elongated body, and wherein the first and second openings having equal diameters; and
a plurality of fluid passages configured to deliver fluid to the first opening and the second opening, wherein the plurality of fluid passages is formed in the elongated body, the plurality of fluid passages comprises:
a first fluid passage in communication with a fluid source;
a second fluid passage in communication with the first fluid passage, the second fluid passage configured to deliver fluid from the first fluid passage to the first opening; and
a third fluid passage in fluid communication with the first fluid passage, the third fluid passage configured to deliver fluid from the first fluid passage to the second opening.

* * * * *